United States Patent [19]

Olander

[11] 4,075,174

[45] Feb. 21, 1978

[54] PROMOTION OF MANGANESE CHELATE CATALYZED POLYPHENYLENE ETHER OXIDE POLYMERIZATION REACTIONS

[75] Inventor: Walter Karl Olander, Clifton Park, N.Y.

[73] Assignee: General Electric Company, Pittsfield, Mass.

[21] Appl. No.: 753,509

[22] Filed: Dec. 21, 1976

[51] Int. Cl.$^2$ .............................................. C08G 65/44
[52] U.S. Cl. ................................................ 260/47 ET
[58] Field of Search .................................... 260/47 ET

[56] References Cited

U.S. PATENT DOCUMENTS

| 3,956,242 | 5/1976 | Olander | 260/47 ET |
| 3,965,069 | 6/1976 | Olander | 260/47 ET |
| 3,972,851 | 8/1976 | Olander | 260/47 ET |

*Primary Examiner*—Lester L. Lee
*Attorney, Agent, or Firm*—Morgan, Finnegan, Pine, Foley & Lee

[57] ABSTRACT

A novel process is disclosed for the preparation of polyphenylene oxides which is based on the use of bis-secondary diamines as reaction rate promoters for the oxidative coupling of a phenolic monomer in the presence of a magnanese chelate catalyst.

25 Claims, No Drawings

PROMOTION OF MANGANESE CHELATE CATALYZED POLYPHENYLENE ETHER OXIDE POLYMERIZATION REACTIONS

The present invention provides an improved process for the oxidative coupling of a phenolic monomer in the presence of a manganese chelate catalyst. The process is based on the use of bis-secondary diamines as reaction promoters.

BACKGROUND OF THE INVENTION

The polyphenylene oxides and methods for their preparation are known in the art. Various catalysts including manganese based catalysts have been employed for the preparation of these polymers by the oxidative coupling of phenolic monomers. These manganese catalyzed polymerizations are disclosed in McNelis, U.S. Pat. Nos. 3,220,979; Nakashio, 3,573,257 and Olander, 3,956,242. In the applicant's copending applications Ser. No. 491,475 filed, July 24, 1974, now U.S. Pat. No. 3,972,851, and Ser. No. 534,903 filed Dec. 20, 1974, now U.S. Pat. No. 3,965,069, there are disclosed novel procedures for polymerizing polyphenylene oxides with complex manganese based catalysts. Polyphenylene oxides are also described in Hay U.S. Pat. Nos. 3,306,874 and 3,306,875. All of these patents and applications are hereby incorporated by reference.

The processes employing manganese based catalysts have been based on the oxidative coupling of a phenolic monomer in an organic solvent. These processes are useful methods for preparing polyphenylene oxide resins, although the reaction rates have not been as rapid as would be desirable for commerical production of these resins. In copending application Ser. No. 582,910 various secondary amines are disclosed as being useful in the production of polyphenylene oxides in the presence of manganese catalysts. The particular reason for employing secondary amines is related to the production of a polyphenylene oxide which when combined with a styrene resin, will produce a composition having impact properties comparable to analogous compositions wherein the polyphenylene oxide is prepared with copper based catalyst systems. It has now been found that certain bis-secondary diamines within the scope of the disclosure of Ser. No. 582,910 may be employed to prepare more active catalyst systems that may be employed to achieve a shorter polymerization cycle wherein a polyphenylene oxide is produced that when combined with styrene resins result in a molding composition having good mechanical and impact properties. If desired the more active catalyst systems may be utilized on a material savings basis wherein reduced quantities of catalyst can be employed to oxidatively couple phenolic monomers at selected reaction rates.

Accordingly, it is a primary object of this invention to provide a method for enhancing the oxidative coupling rate of a phenolic monomer in the presence of a manganese chelate catalyst.

It is also a further object of this invention to provide a method for enhancing the oxidative coupling rate of a phenolic monomer in the presence of a manganese chelate catalyst which results in the production of a polyphenylene oxide resin that may be combined with styrene resins to produce molding compositions that have good mechanical and impact properties.

DETAILED DESCRIPTION OF THE INVENTION

The present invention provides an improved process for the preparation of a polyphenylene oxide which comprises the steps of:

(a) oxidatively coupling a phenolic monomer under polymer forming reaction conditions to form a polyphenylene oxide resin in the presence of an organic solvent and a manganese chelate complex of the formula;

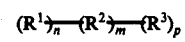

wherein L is a ligand derived from an ω-hydroxyoxime, M is the transition metal manganese (II) or manganese (VII) and $x$ is at least equal to 0.5, the improvement which comprises enhancing the rate of reaction by adding to the reaction mixture an amount of a bis-secondary diamine of the formula:

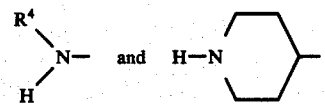

wherein $R^1$ is selected from the group consisting of:

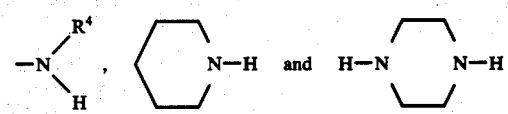

wherein $R^4$ is lower alkyl of from 1 to 10 carbon atoms; $R^2$ is methylene; and $R^3$ is selected from the group consisting of:

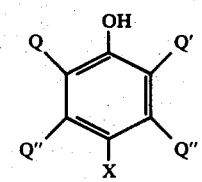

wherein $R^4$ is the same as hereinabove defined; $n$ is 0 or 1; $m$ is 0 or a whole number of from 1 to 10; and $p$ is 0 or 1 with the proviso that the values of $n$ and $p$ are such that the compound always has two nitrogen atoms. An amount of the bis-secondary diamine is employed which is sufficient to increase the rate of reaction. It is to be understood that while the present invention is concerned with increased rate promotion, it is possible to minimize the quantity of catalyst required by employing reduced amount of catalyst that will provide reaction rates that are comparable to the reaction rates provided without a bis-secondary diamine but with increased amounts of manganese catalyst.

The phenolic monomer is selected from compounds having the formula:

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q' is as defined for Q and in addition may be halogen and Q'' are each as defined for Q and in addition may be halogen and Q'' are each as defined for Q' and in addition hydrogen, with the proviso that Q, Q' and Q'' are all free of a tertiary carbon atom.

The ligand that is used to form the manganese (II) chelate complex or the manganese (VII) chelate complex is of the formula:

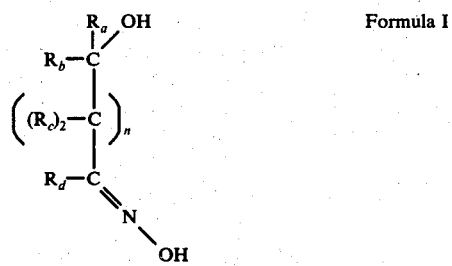

Formula I wherein $R_a$, $R_b$, $R_c$ and $R_d$ are selected from the group consisting of hydrogen, acyclic and cyclic organic radicals and $n$ is a positive integer equal to 0 or 1. As used generally hereinafter reference to manganese (II) chelate will be understood to be applicable to manganese (VII) chelates unless a specific manganese compound is designated.

The manganese (II) chelates can be employed in a mono, bis, tris, tetrakis, etc. ligand form wherein one, two, three, four, etc. bidentate ligands, i.e. bidentate ligand being defined as the cyclic ring structure which arises from the union of a manganese (II) atom with a single oxime nitrogen atom and a single hydroxy oxygen atom associated with a single ω-hydroxyoxime ligand forming molecule, are associated with a single Mn(II) atom. Often manganese (II) chelates, preferably, are employed in their bis-bidentate form wherein two cyclic ring structures arise from the union of a single Mn(II) atom with two separate and distinct ω-hydroxyoxime molecules. Illustrative of Nn(II) chelates in mono-bidentate and bis-bidentate form are the chelates described by Formulas II and III, respectively, set out hereafter.

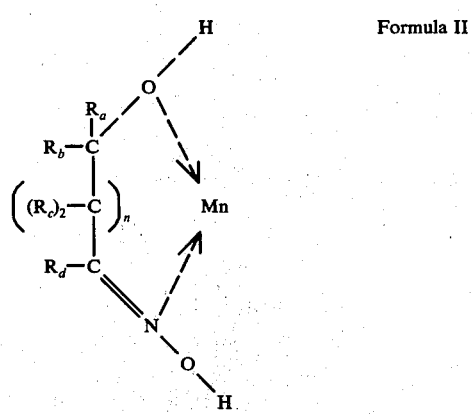

Formula II

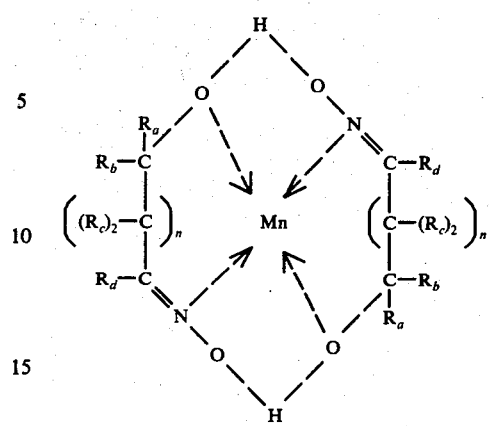

Formula III wherein $R_a$, $R_b$, $R_c$, $R_d$ and $n$ are the same as defined hereinbefore.

The manganese (II) chelates can be prepared by any method known to those skilled in the art which introduces a divalent manganese ion, commonly referred to as Mn(II) or as Mn++, to a hydroxyoxime ligand group, i.e., any appropriate hydroxaldoxime or ketoxime of the Formula I, or any mixture thereof. In general, any amount of manganese (II) and ω-hydroxyoxime can be combined in the preparation of the Mn (II) chelate, however, an amount sufficient to form a Mn (II) bis-bidentate ligand chelate ring type is preferably employed. The aforesaid aldoxime or ketoxime reactants can be prepared by any method well known to those skilled in the art, such as by the well known reactions of a hydroxylamine with α- or β-hydroxy-substituted aldehyde or ketone, respectively, or by the use of suitable oxime exchange techniques, such as those described in U.S. Pat. No. 3,124,613. In the preparation of the effective Mn (II) chelate, a manganese (II) ion associated with ω-hydroxyoxime donor ligand atoms can be derived from any manganese (II) compound which is at least partially dispersible or soluble in an ω-hydroxyoxime solution. Representative manganese (II) compounds include manganese (II) halides such as manganese (II) chloride (also known as manganous chloride), manganese (II) bromide, manganese (II) iodide, etc., as well as other manganese (II) compounds, such as manganese (II) carbonate, manganese (II) oxalate, manganese (II) sulfate, manganese (II) acetate, manganese (II) nitrate, manganese (II) phosphate, etc., including hydrated forms of such Mn (II) compounds. A preferred manganese (VII) compound is potassium permanganate.

A preferred method of preparing manganese (II) ω-hydroxyoxime chelates comprises the formation of a solution of a manganese (II) compound and a ligand forming hydroxyoxime molecule in a suitable solvent, such as methanol or a combination of methanol and an organic solvent such as chlorobenzene, toluene, and xylene, etc., or mixtures thereof.

The possibility of formation of multiple rings, i.e., five- or six-membered chelate rings closely associated with hydrogen bonding is believed — especially with the five-membered chelate rings to markedly increase the stability and effectiveness of Mn (II) chelates in promoting the condensation of a phenol to a polyphenylene oxide.

The $R_a$, $R_b$, $R_c$ and $R_d$ substituents attached to the chelate ring carbon atoms of the manganese (II) ω- hydroxyoxime catalyst — other than hydrogen — can be any acyclic or cyclic organic radical, e.g., alkyl, cycloalkyl, aryl, aralkyl, alkaryl, alkcycloalkyl, cycloalkaryl radicals or combinations thereof, etc., including acyclic and cyclic radicals having electron-releasing constituents, such as amine, i.e., $NH_2$; monoalkylamine, i.e. $NHR^1$, dialkylamine, i.e. $N(R^1)_2$; hydroxy, i.e., OH; alkoxy, i.e., $OR^1$, and alkanoate, i.e., $OOCR^1$, $R^1$ in all cases being an alkyl group. Preferably, the $R_a$, $R_b$, $R_c$ and $R_d$ substituents associated with each five- or six-membered chelate ring is selected from acyclic and cyclic hydrocarbon radicals, more preferably at least one of the $R_b$ or $R_d$ substituents is selected from aromatic radicals, and even more preferably both of the $R_b$ and $R_d$ substituents are selected from aromatic radicals. Preferably, the acyclic and cyclic hydrocarbon radicals contain from 1 to about 30 carbon atoms. Representative of preferred hydrocarbon radicals are the following: methyl, ethyl, propyl, butyl, cyclobutyl, pentyl, cyclohexyl, cycloheptyl, decyl, eicosyl, triacontyl, phenyl, benzyl, methylbenzyl, α-methylbenzyl, methylphenyl, diphenylmethyl, naphthylxylxy, etc.

Representative of ω-hydroxyoxime ligand forming molecules that can be employed to prepare the Mn (II) chelates are the following compounds: benzoin oxime, anisoin oxime, paradimethylaminobenzoin oxime, furoin oxime, acetoin oxime, 2-methyl-2-hydroxy-butan-3-one oxime (also known as methylhydroxybutanone oxime), ω-hydroxyacetophenone oxime, 2-methyl-2-hydroxy-4-pentanone oxime, 2-phenyl-2-hydroxy-butan-3-one oxime (also known as phenylhydroxybutanone oxime), adipoin oxime, etc.

The preferred ω-hydroxyoxime ligand forming molecule that can be employed to prepare the Mn (II) complex catalyst is benzoin oxime.

The phenolic monomer and the manganese (II) ω-hydroxyoxime chelate are combined in a solvent. Any liquid may be employed as a solvent provided that it is capable of forming a solution of the phenolic compound and the Mn (II) chelate including ketones, hydrocarbons, chlorohydrocarbons, nitroaromatic hydrocarbons, ethers, sulfoxides, etc., subject to the proviso that the solvents do not interfere with the catalyst activity of the Mn (II) chelate in the preparation of the polyphenylene oxide. Since the solvent for the phenol and the Mn (II) chelate does not need to act as a solvent for the polymer, it may be desirable sometimes to use a solvent system, such as toluene, xylene, chlorobenzene, or nitrobenzene or mixtures thereof with a sufficient amount of methanol as a solvent system in order to cause the polymer to precipitate from the reaction medium while permitting lower molecular weight polymers to remain in solution until they form higher molecular weight polymers. The relative proportions of phenol to solvent can vary widely. Generally, presently acceptable economic reaction parameters comprise a mole proportion of phenol: solvent within the range of from about 20:80 to about 5:95. Presently preferred phenol: solvent mole proportions are within the range of from about 15:85 to about 10:90.

In order to carry out the Mn(II) chelate promoted self-condensation of phenol to polyphenylene oxide the self-condensation reaction must be carried out in a basic reaction medium, such as that provided by the presence of a strong alkali metal base, e.g. alkali metal hydroxides, alkali metal alkoxides, etc., or mixtures thereof. Commercially available alkali metal bases which are readily attainable are presently preferred, such as sodium hydroxide, potassium hydroxide, lithium hydroxide, sodium methoxide, etc. Currently, it is preferred that anhydrous sodium hydroxide be employed to provide the strong basic reaction environment essential to the polymerization reaction, however, aqueous solutions, e.g. 50 percent, sodium hydroxide can be employed for convenience. The quantity of alkali metal base which is essential to the promotion of the self-condensation reaction can readily be determined without undue experimentation by those skilled in the art. In general, however, suitable phenol: alkali metal base mole ratios are within the range of from about 1:1 to 100:1, preferably from about 40:1 to about 5:1, and even more preferably from about 20:1 to about 10:1. In the preparation of polyphenylene oxide from 2,6-xylenol, optimum overall process reaction conditions, generally, establish the desirability of employing a 2,6-xylenol: alkali metal hydroxide mole ratio within the range of from about 14:1 to about 18:1.

In general, the mole proportions of phenol: Mn (II) chelate can vary widely to provide any desired — including minimum, maximum or optimum — degree of promotion of the reaction rate of phenols to polyphenylene oxide. Although not wishing to limit this invention by any theory, it is believed that the Mn (II) chelate reaction promoter functions as a true catalyst which remains essentially unconsumed or unchanged, e.g. a Mn (II) compound which is neither hydrolyzed nor dissociated due to thermal or other effects into a non-catalytic form during the self-condensation process. Apparently, the reason that the Mn (II) chelate behaves as a true catalyst is due to the unexpected stability of the Mn (II) five- or six-membered ω-hydroxyoxime chelate rings during preparation of the polyphenylene oxides.

It has been found that the Mn (II) chelate catalyst can be employed in very small amounts relative to the amount of phenol reactant while maintaining and often improving the rate of formation of a polyphenylene oxide compared to the rates of polyphenylene oxide formation associated with prior art processes. In general, however, subject to variations in accordance with the type of ω-hydroxyoxime ligand associated with the Mn (II) chelate, reaction rates comparable to those of the prior art can obtained wherein the phenol to Mn (II) chelate mole ratio is within the range of from as low as about 100:1 to as high as about 3000:1, or even as high as about 6000:1. When the reaction is carried out under superatmospheric pressure, a pressure of for example 1 to 40 psig or 1 to 1000 psig may be employed.

In general, it is preferred that minimum quantities of Mn (II) chelate be employed for economic reasons and to provide a polyphenylene oxide containing a minimum amount of the manganese catalyst residue. Accordingly, it is preferred that the initial reaction media mole ratio of phenol: manganese (II) to be at least about 500:1, more preferably at least 1500:1, and even more preferably at least 3000:1, wherein this process is carried out at subatmospheric pressures.

As used herein and in the appended claims wherein phenol: manganese (II) numerical ratios are described, it is to be understood that the numerical proportions describe the number of moles of phenol relative to the number of atoms of manganese (II) associated with the Mn (II) chelate independent of the chelate form, i.e., mono-bidentate, bis-bidentate, etc.

In general, the reaction temperature employed in the preparation of polyphenylene oxide in the presence of the Mn (II) chelate catalyst can be varied widely. Suitable polymerization temperatures generally fall within the range of from about 0° to about 50° C., preferably within the range of from about 10° to about 40° C., and more preferably within the range of from about 20° C to 30° C. since generally optimum self-condensation reaction rates have been found to exist within the 20° C to 30° C temperature range. Mn (II) chelates having strong electron-releasing constituents, e.g. dialkylamino radicals attached to $R_a$, $R_b$, $R_c$, $R_d$ aromatic substituent of Formulas II or III promote optimum reaction rates at temperatures at or above 35° C. Because the self-condensation reactions are exothermic in nature and the Mn (II) chelates are susceptible to thermal deactivation, it is generally desirable to program the addition of the majority of the phenolic monomeric reactant, and in some instances the Mn (II) chelate catalyst, during their initial contact within the reaction media. This programmed addition permits a suitable reaction temperature profile to be obtained whereby the reaction is maintained within a temperature range suited to optimum catalyst efficiency and optimum yields of polyphenylene oxide resin. In addition, more latitude with regard to the upper limits of the reaction temperature range can be obtained wherein the process is carried out at superatmospheric pressures, e.g., 1 to 40 psig, 1 to 1000 psig, or even higher pressures. In the event that the self-condensation reaction is discontinued or interrupted due to deactivation of the Mn (II) chelate at elevated temperatures, the reaction can be resumed in a normal fashion by reducing the temperatures of reaction medium and adding thereto additional manganese (II) chelate catalyst in the amounts required to initiate and maintain the desired catalyst efficiency.

Quite unexpectedly it has been found that the use of a bis-secondary diamine will enhance the rate of self condensation of phenols in comparison to reaction rates that are associated with the use of the Mn (II) chelate catalyst in combination with a dialkyl amine alone. The improvement in reaction rate reduces the overall time required for polymerization and if desired it may be employed to reduce the amount of catalyst that is employed in the oxidative coupling of a phenolic monomer. The quantity of bis-secondary diamine, that may be employed according to the invention will vary between 0.1 to 3.0 mole percent of the phenolic monomer; the preferred amount being about 1.5 mole percent.

The polymerization may be carried out by first preparing a solution of the phenolic monomer in an organic solvent such as toluene; a first part being charged to a reactor and another second part being charged to a pump reservoir for the purpose of being added at a generally constant rate to the reactor after initiation of self-condensation reaction of the phenol to the polyphenylene oxide. Stoichiometric amounts, sufficient to form a bis-bidentate chelate of a Mn (II) compound, e.g. Mn (II) dichloride and a chelate ligand forming molecule, e.g. benzoin oxime, are combined and dissolved in a minimum amount of an Mn (II) chelate-solvent, e.g. methanol. After the Mn (II) chelate-solvent solution is complete, an amount of the phenol-solvent mixture equal to the Mn (II) mixture may be added thereto. At this point it is preferred to add to the reaction mixture all of the bis-secondary diamine, that is to be employed to promote the reaction, at one time. If desired, the bis-secondary diamine may be gradually added to the reaction mixture during the course of the polymerization reaction, with the programmed addition monomer component.

The preferred bis-secondary diamines are N, N'-diethyl-1,6-hexane diamine; 1,3-di-4-piperidinylpropane and piperazine.

The bis-secondary diamines of this invention promote the oxidative coupling of phenolic compounds to prepare a polyphenylene ether resin without adversly affecting the impact properties of molding compositions that are prepared from a polyphenylene oxide resin and a styrene resin. This has not been the result of when bis-primary diamines such as 1,8-octanediamine; meta-xylenediamine; and 1,4-dimethylcyclohexyldiamine which all promote the oxidative coupling reaction rate but will produce polymers that do not have equivalent impact strengths when employed as a molding composition in combination with rubber modified, high impact styrene resins.

The polymerization reaction is carried out by passing a stream of oxygen into the reactor at ambient temperatures at a rate that is adequate to provide sufficient oxygen to be in excess over that which is absorbed while vigorously stirring the solution. The manganese chelate catalyst solution is then added to the phenolic monomer solution. A 50% aqueous sodium hydroxide solution taken up in methanol is added to the reactor in an amount which is equal to about 16:1 of the phenol.

After initiation of the polymerization reaction, the reaction is regulated by the rate of addition of the second phenol reactant portion from the pump reservoir to the reactor in order to provide a controllable exotherm so that the temperature does not exceed substantially 45° C. When a polyphenylene oxide intrinsic viscosity of about 0.50 as measured in chloroform at 25° C. is obtained, the reaction is terminated by the addition of an antisolvent. The antisolvents are well known and include lower alkanols having from 1-8 carbon atoms. The preferred antisolvent is methanol.

The antisolvent may be added directly to the polymerization reaction mixture to precipitate the polyphenylene ether resin along with the manganese chelate catalyst. The alkali activated manganese chelate catalyst is soluble in the typical organic reaction solvent such as toluene while it is insoluble in the typical antisolvent such as methanol.

DESCRIPTION OF THE PREFERRED EMBODIMENTS

The following examples illustrate the process of this invention. They are merely illustrative and are not to be construed to limit the invention in any manner whatsoever.

EXAMPLES

An one gallon Chemco reactor equipped with an internal cooling coil, oxygen inlet tube, monomer/solvent addition system, temperature sensors and mechanical agitator was employed for all the examples.

EXAMPLE 1

CASE A

A reaction combining:

|  | mole | wt % |
|---|---|---|
| 425 g 2,6-xylenol | (3.483) | 16 |
| 1916 g toluene | — | 72 |
| 320 g methanol | — | 12 |
|  |  | 100 |
| 17.0 g 50% aq. NaOH | (0.212) |  |
| 0.2192 g MnCl$_2$ | (.00174) |  |
| 0.7916 g benzoin oxime | (.00348) |  |
| 5.85 g N,N'-diethyl-1,6-hexanediamine | (.0340) |  | was carried out. A methanol solution of manganese chloride and benzoin oxime is added to the oxygenated reactor (4.0 SCFH) containing: 50% of the 2,6-xylenol (ca. 212.5 g.), about 1483 g toluene, the sodium hydroxide and the balance of the methanol. The remaining 2,6-xylenol, as a 32.9 weight percent solution in toluene containing 5.85 g N,N'-diethyl-1,6-hexanediamine, was added at a uniform rate over 27.5 minutes. The reaction temperature was maintained between 75°–90° F. The reaction was agitated at 1000 RPM. After a total reaction period of 75 minutes 40 ml of 50% aqueous acetic acid was added. The polymer was methanol precipitated and isolated in accordance with standard procedures. The I.V. was 0.62 dl/g as measured in chloroform at 30° C.

CASE B

A second reaction was carried out with the following variations:

(a) 85% of the total monomer containing the amine is added over 41 minutes.

(b) reaction terminated at 100 minutes.

The I.V. of the methanol precipitated poly-2,6-dimethyl-1,4-polyphenylene oxide resin was 0.56 dl/g as measured in $CHCl_3$ at 30° C.

CONTROL EXAMPLE

Using the same general procedure of Example 1, Case B- a polymerization combining:

|  | mole | wt % |
|---|---|---|
| 350 g 2,6 xylenol | 2.868 | 16 |
| 1575 g toluene | — | 72 |
| 262 g methanol | — | 12 |
|  |  | 100 |
| 14.3 g 50% aq. NaOH | 0.79 |  |
| 0.1805 g $MnCl_2$ | .00143 |  |
| 0.6519 g benzoin oxime | .00286 |  |
| 3.5 g di-n-butylamine | .027 |  | was carried out. Although the absolute amount of 2,6-xylenol is different from that employed in Example 1, Case A, the relative proportions of solvent, catalyst, base and amine are constant. Both examples are carried out at a molar catalyst ratio 2,6-xylenol/Mn of 2000:1 and at a molar ratio 2,6-xylenol/amine of about 100:1. The I.V. of the poly 2,6-dimethyl-1,4-phenylene oxide after 77 minutes was 0.52 dl/g as measured in chloroform at 30° C.

Blends were prepared which contained 50 parts by weight of the polyphenylene oxide and 50 parts by weight of a rubber modified, high impact styrene resin (Foster Grant 834-containing about 8 parts by weight of polybutadiene rubber). These blends had the following physical properties:

|  | Izod Impact (ft lbs/inch notch) | Gardner Impact (inch lbs) | Elongation (%) |
|---|---|---|---|
| bis-secondary diamine (Case A) | 3.2 | — | — |
| bis-secondary diamine (Case B) | 3.2 | 160 | 100 |
| dibutyl amine (Control) | 2.8 | 180 | 81 |

EXAMPLE 2

A polymerization combining:

|  | moles | wt % |
|---|---|---|
| 600 g 2,6-xylenol | (4.918) | 20 |
| 360 g methanol |  | 12 |
| 2040 g toluene |  | 68 |
|  |  | 100 |
| 24.0 g aq. 50% NaOH | 0.30 |  |
| 14.1 g 1,3-di-4-piperidyl-propane (Reilly Chemicals) | (0.069) |  |
| 0.42 g $MnCl_2$ | (0.00327) |  |
| 1.55 g benzoin oxime | (0.00666) |  |
| molar ratio 2,6 xylenol/Mn - 1500:1 |  |  |
| molar ratio 2,6 xylenol/amine = 73.3 |  |  | was carried out following the general procedure of Case B, of example one. A methanol solution of 1,3-di-4-piperidylpropane, was added directly to the reactor before initiation of the polymerization. The reactor was agitated at 1000 RPM. The temperature profile was 84°–86° F (isothermally). The I.V. of the polymer was 0.73 dl/g, as measured in chloroform at 30° C., after 82 minutes of polymerization.

A control reaction using 9.0 g di-n-butylamine (0.069 mole) in place of 1,3-di-4-piperidylpropane was run. The control reaction contained 10 ml of water as an additional additive, however, this small amount of water has a negligible effect on reaction rate. Polymer samples that were isolated after 70, 80 and 100 minutes were found to have the following instrinsic viscosities:

| Time (minutes) | Intrinsic Viscosity $CHCl_3$ at 30° C |
|---|---|
| 70 | 0.45 |
| 80 | 0.50 |
| 100 | 0.52 |

The poly-2,6-dimethyl-1-4-phenylene oxide of example 2 (prepared with 1,3-di-4-piperidylpropane) was compounded with an equal part of a high impact, rubber modified polystyrene resin, molded and characterized as having the following physical properties:

| Resin | Catalyst/Amine | Izod Impact (ft lbs/in notch) | Elongation (%) |
|---|---|---|---|
| Example 2 | Mn(benzoin oxime)$_2$ 1,3-di-4-piperidyl-propane | 3.7 | 77.1 |
| Control | $CuBr_2$/dibutylamine | 3.4 | 62.0 |

Poly-2,6-dimethyl-1-4-phenylene oxide resin prepared with di-n-butylamine in example two has been shown in application Serial No. 582,910 to possess good similar physical properties when molded with high impact polystyrene.

Doubling the amount of di-butylamine in the control reaction of example two to equalize the moles of nitrogen present does not increase the rate of polymerization or improve the physical properties of the resultant blend with high impact polystyrene. Thus this example duly demonstrates that bis-secondarydiamines promote the oxidative coupling polymerization rate while preserving the high impact characteristics of blends made with rubber modified polystyrene.

EXAMPLE 3

A series of polymerizations combining:

| Component | weight(s) | moles | wt % |
|---|---|---|---|
| 2,6-xylenol | 600 | 4.918 | 20 |
| methanol | 360 | — | 12 |
| toluene | 2040 | — | 68 |
| | | | 100 |
| 50% aq. NaOH | 24.0 | 0.30 | |
| 97% MnCl$_2$ | 0.51 | 0.00393 | |
| 96%-Benzoinoxime | 1.86 | 0.00785 | |
| water | 17.6 | | |
| methyl-tri-n-octyl-ammonium chloride | 0.3 | | | with varying amounts of piperazine, a cyclic bis-secondaryamine, were made following the general procedure of example two. The catalyst in methanol was added to the oxygenated reactor (3.0 SCFH) containing 15% of the total 2,6-xylenol, about 75% of the total toluene, the sodium hydroxide, the water, the methyl-tri-n-octylammonium chloride, the remaining methanol, and the piperazine. The remaining 2,6-xylenol as a 50 weight percent toluene solution was added uniformly over the next 40 minutes after catalyst addition. The polymerization temperature rose from 80° F and was held at 90° F for 50 minutes and then maintained at 84°-86° F thereafter. The agitator was constant at 375 RPM. The results of the use of piperazine were as follows:

| Quantity of Piperazine | | | I.V. (dl/g. CHCl$_3$ at 30° C) | | | | |
|---|---|---|---|---|---|---|---|
| Case | (g) | moles | 60min | 75min | 85min | 90min | 100min |
| A | 6.0 | 0.071 | .20 | .39 | .63 | — | — |
| B | 3.0 | 0.035 | .20 | .50 | — | .86 | 1.36 |
| C | 2.0 | 0.023 | .27 | .44 | — | .49 | — |

CONTROL

The results of three polymerizations, carried out using the same general procedure in example 3 except substituting di-n-butylamine, are given below:

| Quantity of di-n-butylamine | | | I.V. (dl/g. CHCl$_3$ at 30° C) | | | |
|---|---|---|---|---|---|---|
| Case | (g) | moles | 60min | 75min | 90min | 100min |
| D | 9.0 | 0.069 | .18 | .34 | .49 | .54 |
| E | 9.0 | 0.069 | .17 | .33 | .50 | .54 |
| F | 9.0 | 0.069 | .23 | .29 | .49 | .54 |

The polymer build rates are reproducible and representative of the polymerization conditions employed. At comparable molar amounts, ca. 0.070 moles of amine; 2,6 xylenol/amine mole ratio of about 70:1, the bis-secondary amine clearly promotes the polymerization rate over di-n-butylamine, a representative secondary amine. At equal nitrogen content, case B, compared with cases D,E and F, the rate promoting effect of piperazine is unexpectly even more pronounced.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

I claim:

1. In a process for the preparation of a polyphenylene oxide resin which comprises the steps of:
   (a) oxidatively coupling a phenolic monomer to form a polyphenylene oxide resin in the presence of an organic solvent and a manganese chelate complex of the formula:

wherein L is a ligand derived from an ω-hydroxyoxime by conventional means, Mn is the transition metal manganese and x is at least equal to about 0.5, the improvement which comprises enhancing the rate of reaction by adding to the reaction mixture an amount of a bis-secondary diamine of the formula:

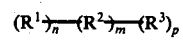

wherein R$^1$ is selected from the group consisting of:

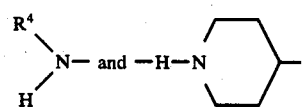

wherein R$^4$ is lower alkyl of from 1 to 10 carbon atoms; R$^2$ is methylene; and R$^3$ is selected from the group consisting of:

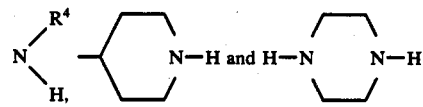

wherein R$^4$ is the same as hereinabove defined; n is 0 or 1; m is 0 or a whole number from 1 to 10; and p is 0 or 1 with the proviso that the values of n and p are such that the compound always has two nitrogen atoms, said amount of said bis-secondary diamine being sufficient to increase the rate of reaction.

2. The process of claim 1 wherein the phenolic monomer is selected from compounds having the formula:

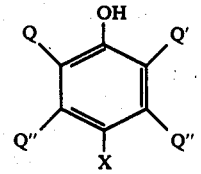

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q' is as defined for Q, and in addition may be halogen and Q" are each as defined for Q' and in addition hydrogen, with the proviso that Q, Q' and Q" are all free of a tertiary carbon atom.

3. The process of claim 2 wherein the ligand of the manganese chelate complex is of the formula:

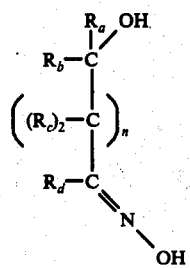

wherein $R_a$, $R_b$, $R_c$, and $R_d$ are selected from the group consisting of hydrogen, acyclic and cyclic organic radicals and $n$ is a positive integer equal to 0 or 1.

4. The process of claim 3 wherein the oxidative coupling is carried out in the presence of between 0.1 and 3.0 mole percent of the bis-secondary diamine.

5. The process of claim 4 wherein the phenolic monomer is 2,6-xylenol.

6. The process of claim 5 wherein the manganese (II) chelate complex is manganese benzoin oxime.

7. The process of claim 3 wherein the bis-secondary diamine is N,N'-diethyl-1,6-hexanediamine.

8. The process of claim 3 wherein the bis-secondary diamine is 1,3-di-4-piperidylpropane.

9. The process of claim 3 wherein the bis-secondary diamine is piperazine.

10. In a process for the preparation of a polyphenylene oxide resin which comprises the steps of (a) oxidatively coupling a phenolic monomer in the presence of oxygen to form a polyphenylene oxide in the presence of an organic solvent and a manganese (II) chelate complex of the formula:

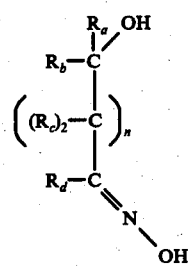

wherein $R_a$, $R_b$, $R_c$, and $R_d$ are selected from the group consisting of hydrogen, acyclic and cyclic organic radicals and $n$ is a positive integer equal to 0 or 1; the improvement which comprises enhancing the rate of reaction by adding to the reaction mixture an amount of a bis-secondary diamine of the formula:

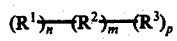

wherein $R^1$ is selected from the group consisting of:

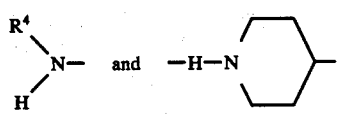

wherein $R^4$ is lower alkyl of from 1 to 10 carbon atoms; $R^2$ is methylene and $R^3$ is selected from the group consisting of

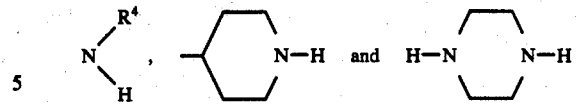

wherein $R^4$ is the same as hereinabove defined; $n$ is 0 or 1; $m$ is 0 or a whole number from 1 to 10; and $p$ is 0 or 1 with the proviso that the values of $n$ and $p$ are such that the compound always has two nitrogen atoms, said amount being between 0.1 to 3.0 mole percent of the phenolic monomer.

11. The process of claim 10 wherein the phenolic monomer is 2,6-xylenol.

12. The process of claim 11 wherein the manganese (II) chelate complex is manganese benzoin oxime.

13. The process of claim 12 wherein the bis-secondary diamine is all added to the reaction mixture at one time.

14. The process of claim 13 wherein the bis-secondary diamine is N,N'-diethyl-1,6-hexanediamine.

15. The process of claim 13 wherein the bis-secondary diamine is 1,3-di-4-piperidinylpropane.

16. The process of claim 13 wherein the amount of bis-secondary diamine is 0.1 to 3.0 moles percent of the 2,6-xylenol.

17. In a process for the preparation of a polyphenylene oxide resin which comprises the steps of:

(a) oxidatively coupling a phenolic monomer to form a polyphenylene oxide resin in the presence of an organic solvent and a manganese chelate complex of the formula:

$(L)_x Mn$ wherein L is a ligand of the formula

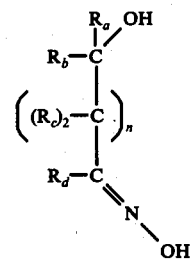

wherein $R_a$, $R_b$, $R_c$, and $R_d$ are selected from the group consisting of hydrogen, acyclic and cyclic organic radicals and $n$ is a positive integer equal to 0 or 1; and wherein, Mn is the transition metal manganese and $x$ is at least equal to about 0.5, the improvement which comprises enhancing the rate of reaction by adding to the reaction mixture an amount of a bis-secondary diamine of the formula

wherein $R^1$ is selected from the group consisting of:

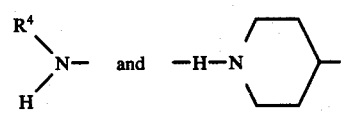

wherein R⁴ is a lower alkyl of from 1 to 10 carbon atoms; R² is methylene; and R³ is selected from the group consisting of:

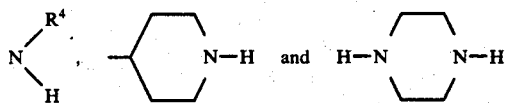

wherein R⁴ is the same as hereinabove defined; n is 0 or 1; m is 0 or a whole number from 1 to 10; and p is 0 or 1 with the proviso that the values of n and p are such that the compound always has two nitrogen atoms, said amount of said bis-secondary diamine being sufficient to increase the rate of reaction.

18. The process of claim 17 wherein the phenolic monomer is selected from compounds having the formula

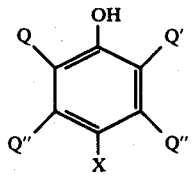

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q' is defined for Q, and in addition may be halogen and Q" are each as defined for Q' and in addition hydrogen, with the proviso that Q, Q' and Q" are all free of a tertiary carbon atom.

19. The process of claim 18 wherein the oxidative coupling is carried out in the presence of between 0.1 and 3.0 mole percent of the bis-secondary diamine.

20. The process of claim 19 wherein the phenolic monomer is 2,6-xylenol.

21. The process of claim 20 wherein the manganese (II) chelate complex is manganese benzoin oxime.

22. The process of claim 17 wherein the bis-secondary diamine is all added to the reaction mixture at one time.

23. The process of claim 17 wherein the bis-secondary diamine is N,N'-diethyl-1,6-hexanediamine.

24. The process of claim 17 wherein the bis-secondary diamine is 1,3-di-4-piperidylpropane.

25. The process of claim 17 wherein the bis-secondary diamine is piperazine.

* * * * *

UNITED STATES PATENT AND TRADEMARK OFFICE
CERTIFICATE OF CORRECTION

PATENT NO. : 4,075,174
DATED : February 21, 1978
INVENTOR(S) : Walter Karl Olander It is certified that error appears in the above–identified patent and that said Letters Patent are hereby corrected as shown below:

Column 3, line 47, "Nn(II)" should read --Mn(II)--.

Column 7, line 9, after "$R_c$" insert --or--.

Column 8, line 53, "An" (first instance) should read --a--.

Column 16, line 9, after "is" insert --as--.

Signed and Sealed this

Sixth Day of June 1978

[SEAL]

Attest:

RUTH C. MASON
*Attesting Officer*

DONALD W. BANNER
*Commissioner of Patents and Trademarks*